United States Patent [19]
Dallman

[11] Patent Number: 5,438,819
[45] Date of Patent: Aug. 8, 1995

[54] BLADE ASSEMBLY FOR A BRUSH CUTTING MACHINE

[76] Inventor: Jimmie J. Dallman, 3709 99th Dr. SE., Everett, Wash. 98205

[21] Appl. No.: 234,670
[22] Filed: Apr. 28, 1994
[51] Int. Cl.6 .................. A01D 34/64; A01D 34/73
[52] U.S. Cl. ............................. 56/295; 56/17.5
[58] Field of Search ..................... 56/295, 255, 17.5

[56] References Cited

U.S. PATENT DOCUMENTS

| | | | |
|---|---|---|---|
| 1,622,611 | 3/1927 | Sera. | |
| 2,715,307 | 8/1955 | Carter | 56/295 |
| 2,786,322 | 3/1957 | McEvers | 56/295 |
| 2,963,844 | 12/1960 | Engler | 56/295 |
| 3,090,187 | 5/1963 | Livingston | 56/295 |
| 3,103,093 | 9/1963 | House | 56/295 |
| 3,152,432 | 10/1964 | Scarnato et al. | 56/295 |
| 3,395,522 | 8/1968 | Zweegers | 56/295 |
| 3,507,104 | 4/1970 | Kline et al. | 56/295 |
| 3,514,935 | 6/1970 | Bonsor | 56/295 |
| 3,762,138 | 10/1973 | Michael | 56/295 |
| 4,611,459 | 9/1986 | Cartner | 56/295 X |
| 4,922,698 | 5/1990 | Taylor | 56/295 |

*Primary Examiner*—Stephen J. Novosad

[57] ABSTRACT

A blade assembly for a brush cutting machine. The blade assembly comprises two blades, each blade having a two sided cutting edge on both a first and second ends. The four sided cutting edge blades are rotatable from the first end to the second end and invertible from the upper surface to the lower surface to take advantage of all four cutting edges on each blade. A first blade is attached to the bottom surface of a first end of the crossbar. A second blade is attached to the bottom surface of a second end of the crossbar. The blades are attached to the bottom surface of the crossbar with counter-bored holes in the blades that correspond to counter-bored holes in the crossbar. Counter-bored holes in the bottom surface of the blades recess the head of the attaching bolt so that the top of the head of the attaching bolt is flush with the bottom surface of the blades. Counter-bored holes in the crossbar allow the attaching bolt to have a graduated diameter such that a large diameter bolt is used for a secure attachment of the blades to the crossbar, while allowing a small diameter bolt to receive a conventionally sized nut at the top of the crossbar. The blades of the present blade assembly have a re-cuttable bevel to provide a resharpenable cutting edge. A second embodiment provides offsets on the crossbar for positioning the blades closer to the ground for a closer cut of brush. A method for cutting brush with a brush cutting machine having the present blade assembly is also disclosed.

20 Claims, 13 Drawing Sheets

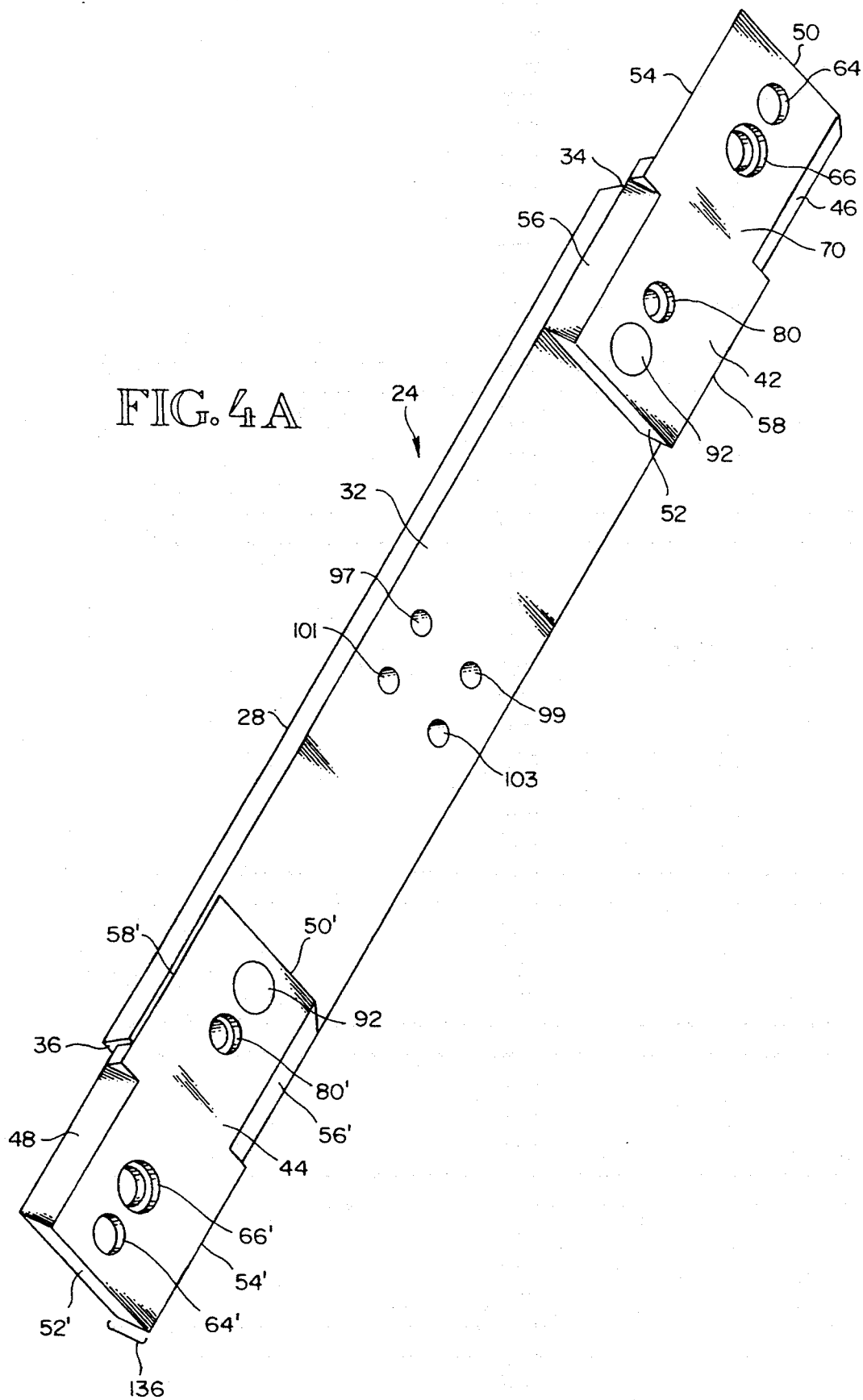

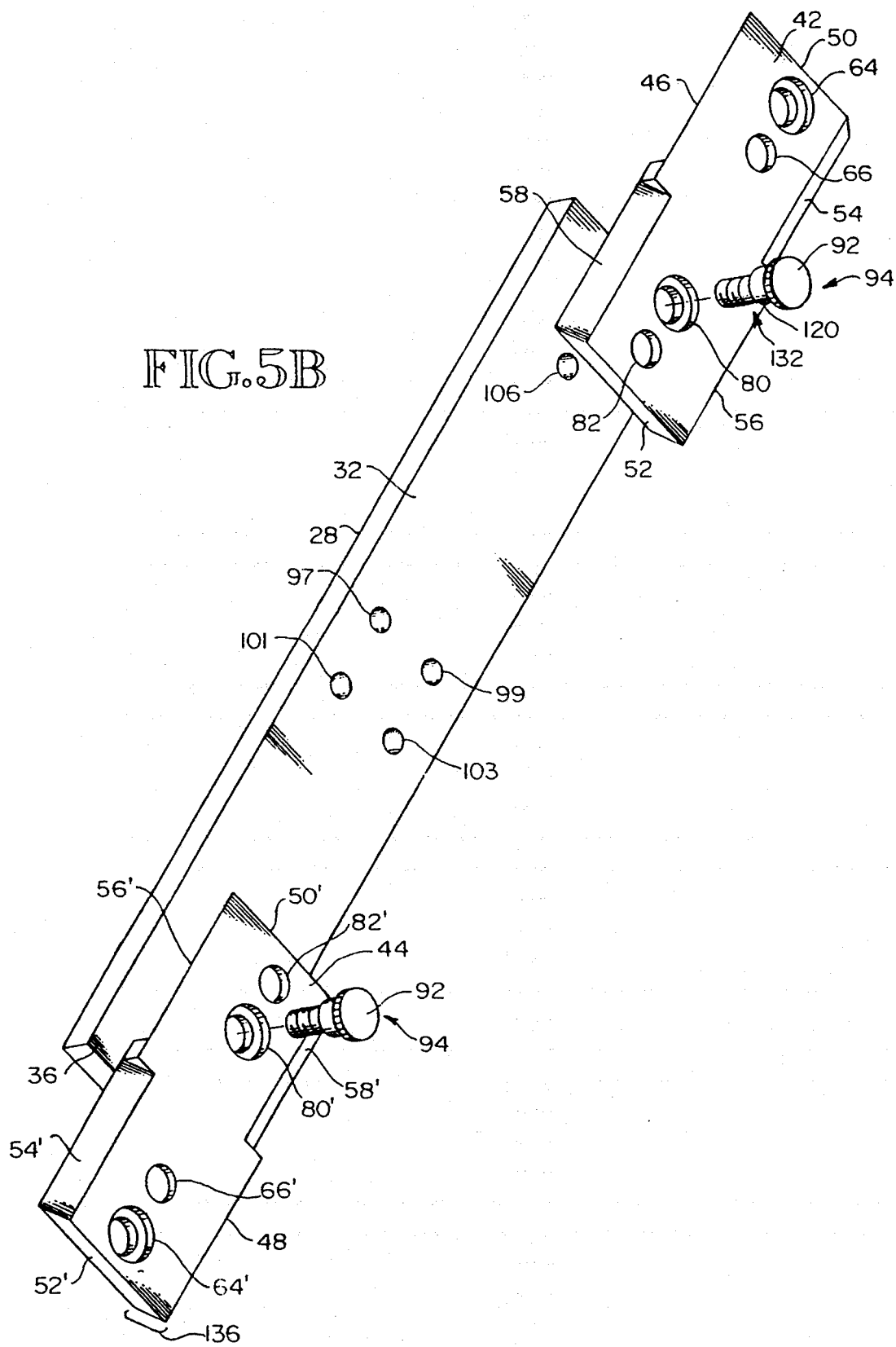

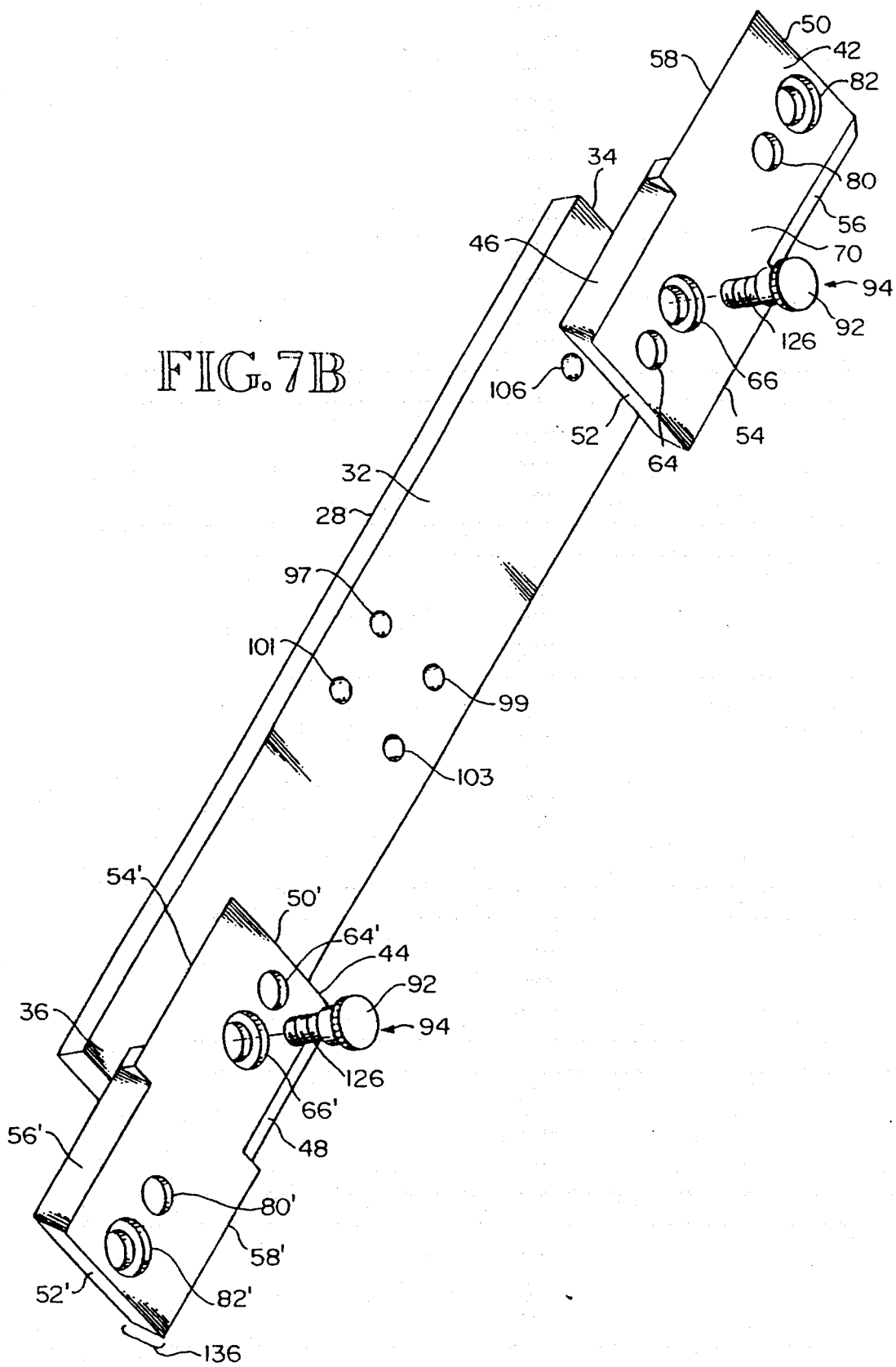

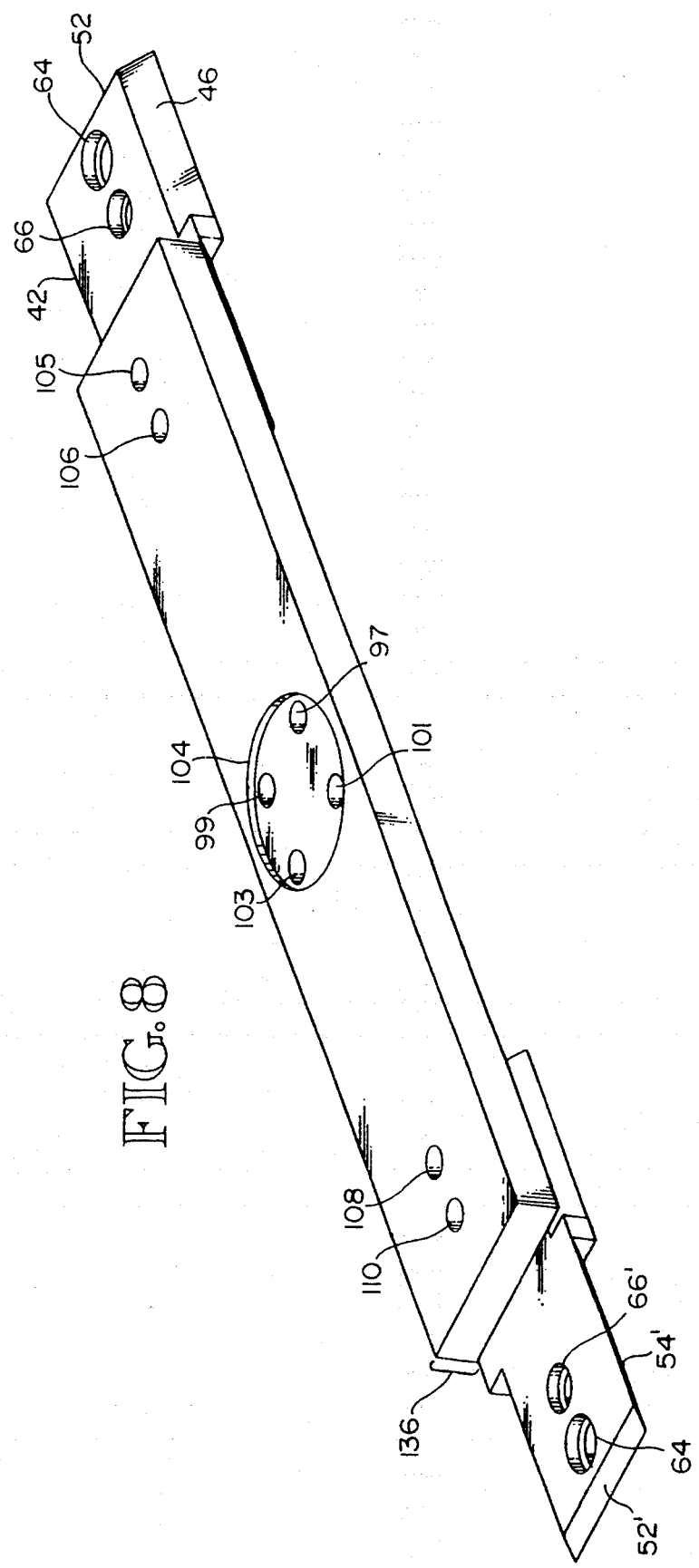

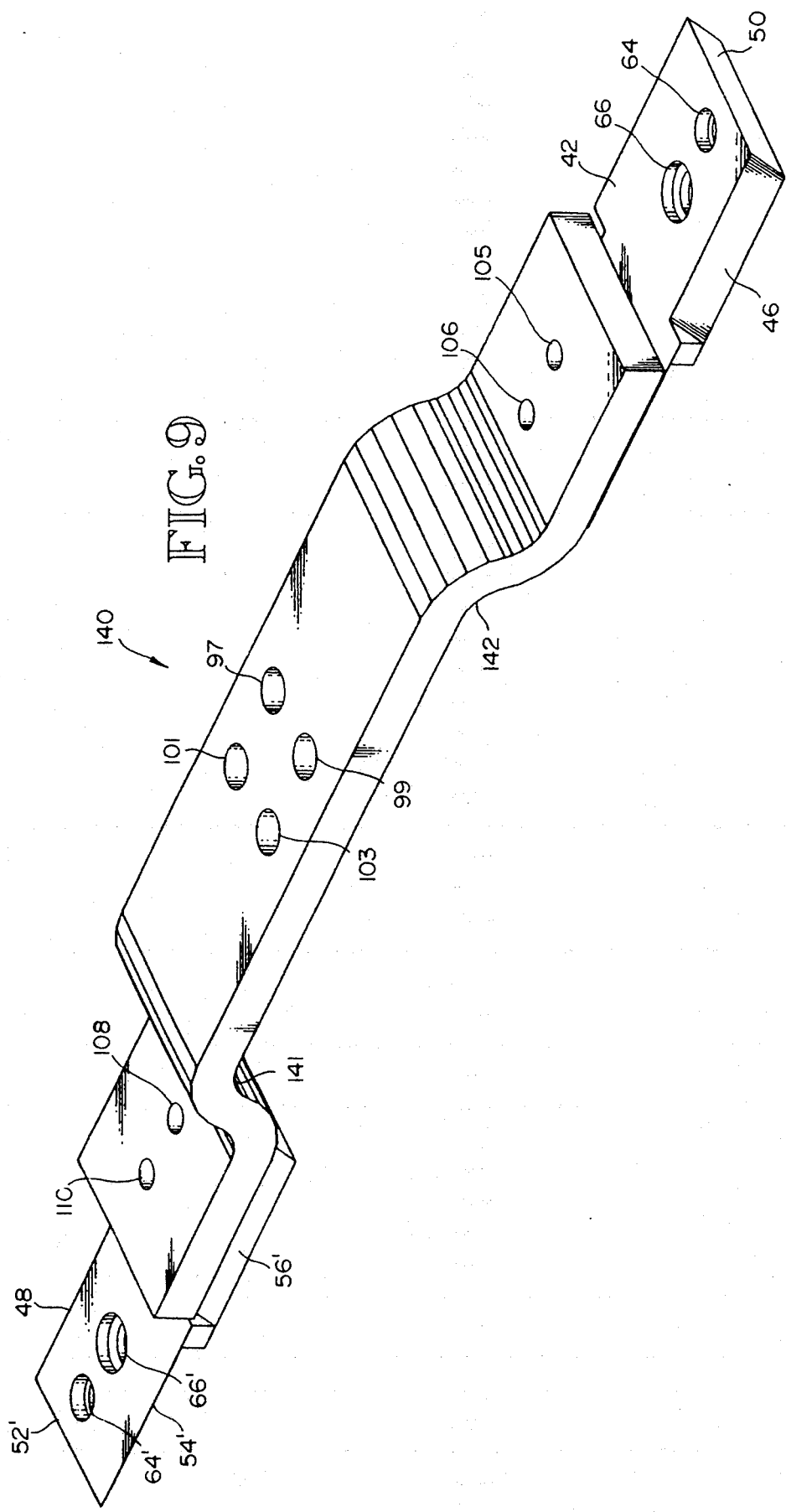

BLADE ASSEMBLY FOR A BRUSH CUTTING MACHINE

BACKGROUND OF THE INVENTION

In the field of brush cutting using a riding type machine such as a tractor, conventional machines use a blade assembly which generally includes two blades, each blade having two ends with a double sided cutting edge on one end. In one form of the prior art, a crossbar is used also having two ends, each end having one position for attaching a blade to the crossbar. One blade is attached at the bottom surface of the crossbar at one end of the crossbar with the blade in use presenting a forward facing blade to the material to be cut. A similar blade is attached at the other end to the bottom surface of the crossbar with a rearward facing blade presented to the material to be cut. As the crossbar rotates around a horizontal plane, the blade having the rearward facing cutting edge moves into the position of the forward facing cutting edge so that the two blades cut the material in a circular fashion. At the attachment position where the prior art blade attaches to a crossbar there is no cutting edge. The prior art blade then is turned over when the cutting edge on one side is dulled and the second cutting edge is used. In the prior art, a bolt is positioned through a hole in the distal end of the blade and into a corresponding hole in the crossbar. A nut is attached to the bolt at the top of the crossbar thus attaching the blade to the crossbar. During brush cutting, as the blade is presented to the ground, the head of the bolt protrudes from the bottom surface of the blade. In another form of the prior art, a pair of reversible blades are attached to the top surface of the crossbar thus requiring a stop mechanism so that as the blades rotate they do not strike the drive shaft that attaches the blade assembly to the boom of the cutting machine. In an alternate embodiment of the prior art, there is an offset in the form of a curve in the blade which allows the blade to be presented closer to the ground than the generally flat blade to thereby provide a closer cut. There are a number of problems in the prior art blade assemblies used for brush cutting. With the double sided cutting edge on one end there are only two useable cutting surfaces on each blade. The prior art blade is not resharpenable so that once the two cutting edges have been dulled the blade must be permanently replaced. These cutting surfaces are dulled rather quickly requiring much maintenance and expense to replace the blade. Further, with the nut and bolt attachment of the blade to the crossbar in the prior art, the head of the bolt protrudes from the lower surface of the blade. The lower surface of the blade is presented to the ground during brush cutting and when the blade strikes a rock or the like, hitting the head of the bolt, the bolt will most often be chipped, compromising the integrity of the bolt. This suggests a possible dangerous situation if the blade were to become unattached from the crossbar, and requires frequent replacement of the bolt with corresponding maintenance and expense.

U.S. Pat. No. 1,622,611 to Sera discloses a lawn mower with blades that rotate in a horizontal plane to cut grass in a circular path.

U.S. Pat. No. 2,786,322 to McEvers discloses a power mower rotary blade with four cutting edges that is horizontally rotatable so that two different sets of blades can be used in rotary operation. The blades are attached to a cutter bar using countersunk screws.

U.S. Pat. No. 3,395,522 to Zweegers teaches a mowing machine which includes a rotatable cutting device having drums with multiple blades attached that roll along the ground to cut grass, hay or the like.

U.S. Pat. No. 3,507,104 to Kline et al discloses a knife mounting for a rotary mower whereby two knives on one cutter can be removed and substituted for two knives on an adjacent rotor so more knives can be used in the field before the knives are resharpened.

U.S. Pat. No. 3,762,138 to Michael discloses a mower blade assembly with cutter elements removably attached to a blade bar with flush mounted attachment pins.

U.S. Pat. No. 4,611,459 to Cartner discloses a blade assembly having four cutting edges, whereby the blade is attached to the upper surface of the crossbar. This configuration requires a stop mechanism so that as the crossbar rotates, the blades do not cut through the drive shaft that connects the blade assembly to the boom of the cutting machine.

U.S. Pat. No. 4,9222,698 to Taylor discloses a cutter bar for a rotary lawn mower which has a plurality of indexable blades, whereby the cutter bar may be replaced without removing the blades or up-ending the mower.

SUMMARY OF THE INVENTION

In order to overcome problems inherent in the prior art, there has been devised by the present invention a unique blade assembly for use on a brush cutting machine. The blade of the present blade assembly comprises a two sided cutting edge on both ends of the blade. With each end of the blade having two cutting edges there are thereby formed four cutting edges on each blade. In operation, this four sided cutting edge blade is attached to the bottom surface of the crossbar on a first far end of the crossbar so that the cutting edge in use will be forward facing. In a like manner, a similar blade is attached to the bottom surface of the crossbar on a second far end of the crossbar so that its cutting edge in use will be rearward facing. As the crossbar rotates around 360 degrees in a horizontal plane, the rearward facing cutting edge of the blade at the second far end of the cross bar is rotated to be positioned as the forward facing cutting edge so that the two blades on the crossbar serve to alternate having a forward facing and rearward facing cutting edge. In this way, the brush is cut in a circular motion. The advantage of mounting the blades to the bottom surface of the crossbar is that this allows the blades to be free swinging around the entire 360 degree cutting circle. A stop mechanism is also thus not required to prevent the blade from cutting through the drive shaft that connects the blade assembly to the boom of the cutting machine. Each blade portion of the subject blade assembly comprises two counter-bored holes on a first and second ends so that the blade can be reversed, both from front to back and side to side, taking full advantage of the four cutting edges provided on the blade. The counter-bored holes in the blade portion of the blade assembly allow the head of the attaching bolt to be flush with the bottom surface of the blade, thereby increasing the shearing surface capacity of the attaching bolt. This is an advantage over the prior art since, when the bottom surface of the blade strikes a rock or the like, the recessed head of the attaching bolt will not be chipped. The blade portion of the present invention is formed from thicker metal than that of the prior art so that in addition to the head of the bolt being recessed into the lower surface of the blade, the head of the bolt is surrounded by thicker metal thereby protecting it even further. The recessed head of the bolt and the thicker metal surrounding it thus prolongs the life of the bolt and increases its integrity during use. The thicker metal of the subject blade also allows it to be resharpened. More specifically, as the cutting edge of the blade dulls, instead of resharpening the existing edge of the blade, because of the thicker metal of the subject invention, a new edge entirely is re-cut with a torch. A new edge can be re-cut at least once. Because of its generally flat, downward sloping bevel, it can easily be re-cut to have the same general bevel, contrary to the prior art which cannot be resharpened. In the preferred embodiment of the present invention, the crossbar portion of the subject blade assembly comprises two counter-bored holes on its first and second ends for attaching the blade to the crossbar which correspond to the counter-bored holes in the first and second ends of the blade. As one blade is attached to each end of the crossbar, thereby attaching a first blade to the first end of the crossbar and a second blade to the second end of the crossbar, and two counter bored holes on the first end of the crossbar correspond to the four counter bored holes in the first blade for positioning one of the four cutting edges of the first blade forwardly. In a similar manner, the two counter bored holes on the second end of the crossbar correspond to the four counter bored holes in the second blade for positioning one of the four cutting edges of the second blade rearwardly. In use, when one of the four available cutting edges on each blade is chosen to be put in the using position, an abruptly graduated diameter attaching bolt is positioned through the counter-bored hole in the opposite end of the blade so that the head of the bolt is recessed from the lower surface of the blade that is presented to the ground. The portion of the bolt that exits from the upper surface of the blade is then positioned through the corresponding counter-bored hole in the crossbar such that the smallest diameter of the hole in the blade matches the largest diameter of the corresponding counter-bored hole in the crossbar. In this way, a bolt is used with a large diameter at its top closest to its head, for a strong, secure attachment, while having a smaller diameter at its screw end for easy securement of the bolt at the upper surface of the crossbar with a more conventional sized nut.

In a second embodiment of the present invention there is provided an alternative crossbar having a curve in its horizontal plane to provide an offset for the cutting edge, so that the cutting edge is brought closer to the ground and to the material to be cut. This is an advantage over the prior art since the improved blade assembly of the present invention can be used while still maintaining the closer cut provided by the offset. In this way, the operator does not have to bring along a conventional blade should the closer cutting offset be desired.

The blade assembly of the present invention can be used with the control assembly as described in the copending application entitled A Control Assembly for a Brush Cutting Machine, whereby the blade assembly is rotated to be forward facing into the material to be cut and the vertical and angular movement of the blade assembly relative to the ground is controlled to provide a close cut of the brush with less stress and fatigue for the brush cutting machine and the operator.

It is therefore an object and advantage of the present invention to provide a blade assembly for a brush cutting machine that is safer, easier and less expensive in its operation and maintenance.

It is another object and advantage of the present invention to provide a blade assembly having free swinging blades around an entire 360 degree cutting radius.

It is yet another object and advantage of the present invention to provide a blade assembly having blades which do not interfere with the drive shaft connecting the blade assembly to the boom of the cutting machine.

It is still yet another object and advantage of the present invention to provide a blade assembly that has more cutting edges and is thereby less expensive in its use and maintenance and more convenient for the operator.

It is still yet another object and advantage of the present invention to provide a blade assembly that has an attaching means for attaching the blade to the crossbar that is recessed from the surface of the blade that is presented to the ground thereby making the blade assembly safer to use and less vulnerable to breakage and consequent replacement and expense.

It is still yet another object and advantage of the present invention to provide a blade assembly that has an attaching means that provides for use of a graduated diameter bolt so a large diameter bolt is used for a secure attachment while still allowing a smaller diameter screw end to be secured with a nut, thereby providing a secure and convenient attachment.

It is still yet another object and advantage of the present invention to provide a blade assembly that is re-cuttable and therefore much longer lasting with less expense and more convenience.

It is still yet another object and advantage of the present invention to provide a blade assembly with an alternate embodiment having an offset in the crossbar so that a closer cut of brush is accomplished without a change in blade.

These and other objects and advantages will become apparent with a review of the following drawings and from a study of the specification portion hereinafter describing the preferred embodiments of the invention.

BRIEF DESCRIPTION OF THE DRAWINGS

FIG. 1A is an enlarged top perspective view of the blade assembly of the present invention.

FIG. 4A is a bottom perspective view of the blade assembly after the blade is attached to the crossbar when the first cutting edge is used.

FIG. 5B is an exploded bottom perspective view of the blade assembly when the second cutting edge is used.

FIG. 7B is an exploded bottom perspective view of the blade assembly when the fourth cutting edge is used.

FIG. 8 is a top perspective view of the blade assembly of the present invention.

FIG. 9 is a top perspective view of a second embodiment of the present invention, showing an alternative crossbar.

DESCRIPTION OF THE PREFERRED EMBODIMENT

Figure 1:
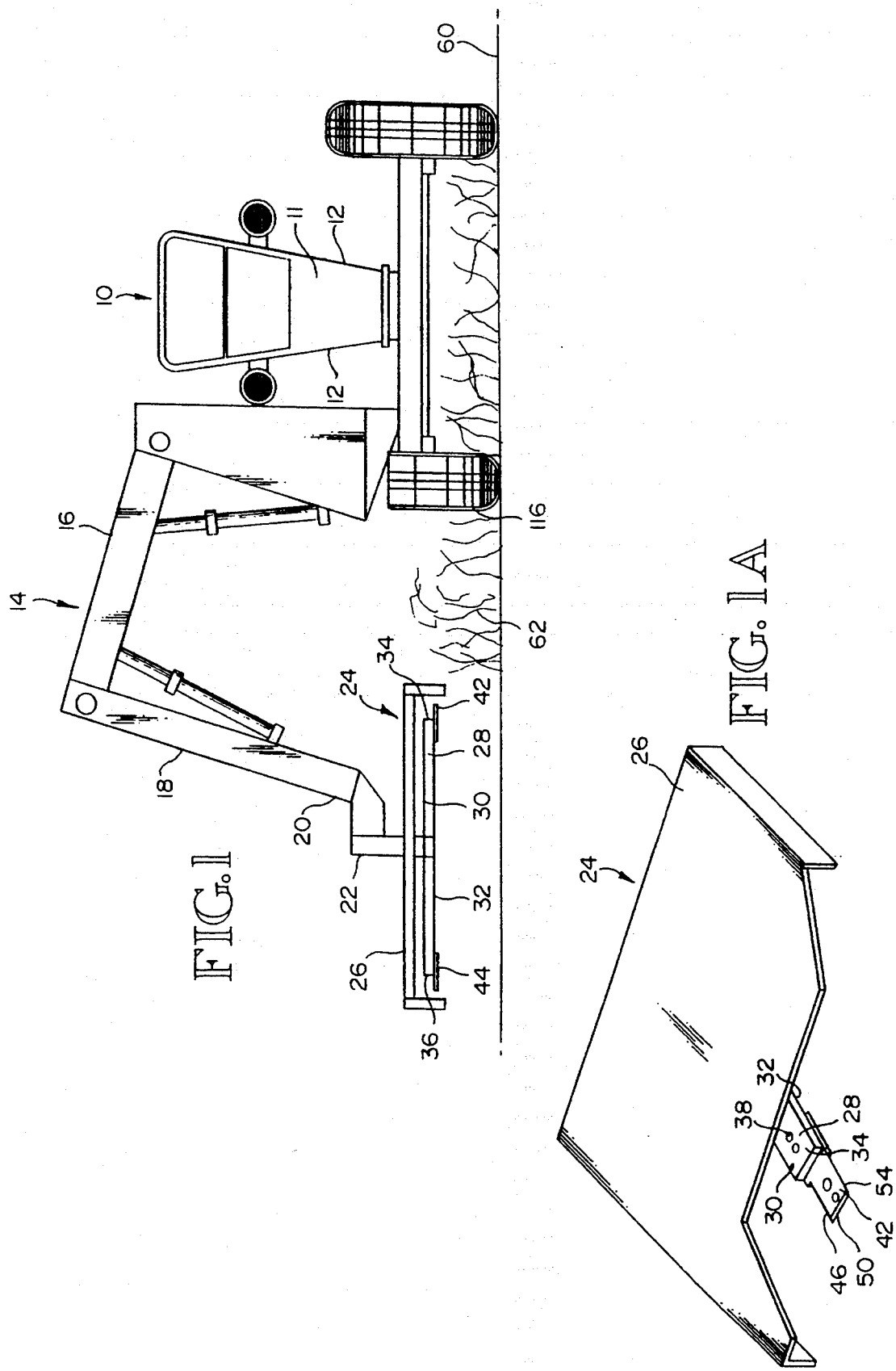
FIG. 1 is a front plan view showing how the blade assembly of the present invention is positioned on an existing cutting machine.
Figure 2:
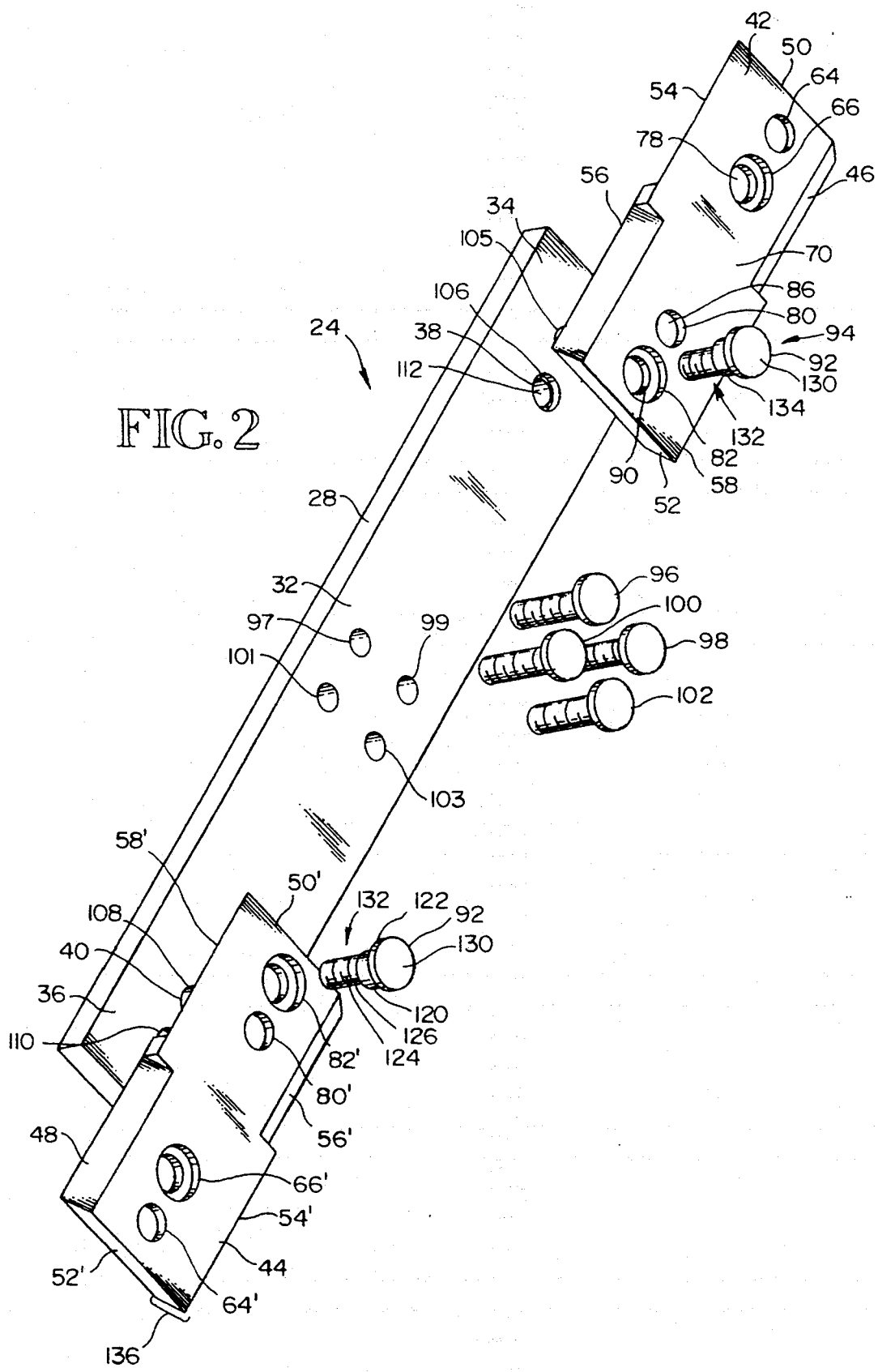
FIG. 2 is an exploded bottom perspective view showing how the blade assembly of the present invention is attached together in operation.

Referring now to the drawings in general and in particular to FIG. 1 of the drawings there is shown a front plan view of the blade assembly of the present invention as it is positioned on a typical brush cutting machine. Also shown in FIG. 1A is an enlarged top perspective view showing the blade assembly of the present invention. In FIG. 1, the brush cutting machine is shown generally by the number 10, the brush cutting machine 10 having a front 11 and sides 12. Positioned at the side 12 of the brush cutting machine 10 is a boom 14, having two arms 16 and 18. The first arm 16 is closest to the brush cutting machine 10, the second arm 18 is attached to the first arm 16 and is referred to as the dipper boom. Attached to the distal end 20 of the second arm 18 is the drive shaft 22 which attaches the blade assembly 24 to the second arm 18 or dipper boom. Attached to the drive shaft 22 is the blade assembly 24 which generally includes in part a conventional covering shroud 26. As seen in FIGS. 1 and 1A positioned under the covering shroud 26 is a crossbar 28 having a top surface 30 and a bottom surface 32. The crossbar 28 has a first far end 34, a second far end 36, and a first 38 and second 40 intermediate attachment positions for attaching the blades to the crossbar 28, as seen in FIG. 2. The crossbar 28 is attached to the drive shaft 22 which rotates the crossbar 28 during operation. Attached to the bottom surface 32 of the crossbar 28 on the first far end 34 is a first blade 42. In a similar manner, attached to the bottom surface 32 of the crossbar 28 on the second far end 36 of the crossbar 28 is a second blade 44. The first blade 42 first utilizes the forward facing cutting edge 46 and the second blade 44 first utilizes the rearward facing cutting edge 48, as seen in FIG. 2. In operation, as the crossbar 28 rotates around a horizontal plane, the second blade 44 having the rearward facing cutting edge 48 moves into the position of the forward facing cutting edge 46 of the first blade 42 so that the two blades 42 and 44 cut the material in a circular fashion. With the blades 42 and 44 attached to the bottom surface 32 of the crossbar 28, it can be seen in FIG. 1 that the blades 42 and 44 do not swing into the drive shaft 22 that rotates the blades 42 and 44 during operation. This is an improvement over the prior art which requires a stop mechanism so that the blades do not hit the drive shaft and does not allow the free-swinging movement of the blades around an entire 360 degree cutting radius. The blades 42 and 44 of the present invention are allowed the free swinging movement around an entire 360 degree cutting radius relative to the crossbar 28. It is, therefore, within the spirit and scope of the present invention for the blades 42 and 44 to be free-swinging relative to the crossbar 28 at any angle. The first 42 and second blades 44 attached to the bottom surface 32 of the crossbar 28 alternate between having a forward facing cutting edge 46 and a rearward facing cutting edge 48. The following descriptions often refer to the cutting edge of the forward facing cutting edge 46 of the first blade 42 for purposes of illustration. It is to be understood however, that the same descriptions apply to the cutting edge 48 on the second blade 44, since after rotation of the blades 42 and 44, the rearward facing cutting edge 48 of the second blade 44 will be in the position of the cutting edge 46 on the first blade 42.

FIG. 2 is an exploded bottom perspective view showing the blade assembly of the present invention. In FIG. 2 it can be seen that the blade 42 of the blade assembly 24 is a generally rectangular metal member having two ends 50 and 52. On each end 50 and 52 of the blade 42 there is formed a double sided cutting edge. On the one first end 50 of the blade 42 there is thus a forward facing cutting edge 46 and a rearward facing cutting edge 54. In a similar manner, on the other second end 52 of the blade 42 there is a forward facing cutting edge 56 and a rearward facing cutting edge 58 that are reversed in vertical position from the forward facing cutting edge 46 and rearward facing cutting edge 54 on the first end 50 of the blade 42. In operation, the forward facing cutting edge 46 of the first end 50 of the blade 42 is first presented to the ground 60 and to the brush 62 to be cut, as seen in FIG. 1. A single cutting edge on each of the two blades 42 and 44 is therefore used at any given time in the operation. In FIGS. 1 and 2 it can further be seen that the blade 42 carries two holes proximate to each end 50 and 52. The first end 50 of the blade 42 has counter bored holes 64 and 66 which go unused when the forward facing cutting edge 46 is the cutting edge in service. The counter-bored hole 64 is drilled to have its diameter 68 at the lower surface 70 of the blade 42 to be smaller than its diameter 72 at the upper surface 74 of the blade 42. The counter-bored hole 66 is drilled to have its diameter 76 at the lower surface 70 of the blade 42 to be larger than its diameter 78 at the upper surface 74 of the blade 42. In a similar fashion, the second end 52 of the blade 42 also has counter-bored holes 80 and 82 proximate thereto. The counter-bored hole 80 is drilled to have its diameter 84 at the lower surface 70 of the blade 42 to be smaller than its diameter 86 at the upper surface 74 of the blade 42. And, the counter-bored hole 82 is drilled to have its diameter 88 at the lower surface 70 to be larger than its diameter 90 at the upper surface 74 of the blade 42. When the cutting edge 46 is used, it can be seen in FIGS. 2, 4A and 4B that the counter-bored hole 82 is the corresponding hole used to attach the blade 42 to the crossbar 28. The counter-bored hole 82 having a larger diameter 90 at the lower surface 70 of the blade 42 than at the upper surface 74 of the blade 42 serves to recess the head 92 of the attaching bolt 94 from the lower surface 70 of the blade 42. When the forward facing cutting edge 46 is the cutting edge in service, the blade 42 is attached to the crossbar 28 by the attaching bolt 94 being positioned through the lower surface 70 of the blade 42, at the hole 82 in the blade 42 and then through the bottom 32 and top 30 surfaces of the crossbar 28. The blade 44 is the same as the blade 42 in reversed or turned over position. So the hole 64 in the blade 42 is the same as hole 64' in the blade 44 if the blade 42 were turned over; the hole 66 in the blade 42 is the same as the hole 66' in blade 44 if blade 42 were turned over; the hole 80 in the blade 42 is the same as hole 80' in the blade 44 if the blade 42 were turned over; and the hole 82 in the blade 42 is the same as hole 82' in the blade 44 if the blade 42 were turned over. In the preferred embodiment of the present invention, the crossbar portion 28 of the subject blade assembly 24 is attached to the drive shaft 22 of the brush cutting machine 10 by four securing bolts 96, 98, 100, 102, positioned through corresponding holes 97, 99, 101 and 103 in the crossbar 28, the drive shaft 22 serving to rotate the crossbar 28 and consequently the blades 42 and 44. Surrounding the holes 97, 99, 101, and 103, the top surface 30 of the crossbar 28 has a recess 104 for attaching the crossbar 28 to the drive shaft 22 such that the shock from operation of the brush cutting machine 10 is absorbed by the drive shaft 22 instead of the bolts 96, 98, 100 and 102. The recess 104 is shown in the top perspective views of FIGS. 8 and 9.

The crossbar 28 includes a counter-bored hole 105 at its first far end 34 and a counter-bored hole 106 at its first intermediate attachment position 38, the counter-bored holes 104 and 106 corresponding to the counter-bored holes 64, 66, 80 and 82 in the first blade 42. Similarly, the crossbar 28 has a counter-bored hole 108 at its second intermediate attachment position 40 and a counter-bored hole 110 at its second far end 36 which correspond to the holes 64', 66', 80', and 82' in the second blade 44. Since the crossbar 28 is not turned when a cutting edge is changed, the counter bored holes 105, 106, 108, and 110 in the crossbar 28 all have the larger diameter 112 of the hole at the bottom surface 32 of the crossbar 28 and the smaller diameter 114 at the top surface 30 of the crossbar 28. The four counter-bored holes 105, 106, 108 and 110 in the crossbar 28 are provided to maintain the length of the blade 42 at the same length relative to the cutting machine 10 regardless of which cutting edge 46, 54, 56, 58 is the cutting edge in use. The hole 104 is positioned at the first far end 34 of the crossbar 28 and is used when the cutting edge in use utilizes the hole 66 or 80 in the first blade 42 that is inward from the ends 50 or 52 of the blade 42. The hole 106 is positioned in the first intermediate attaching position 38 and is used when the cutting edge in use utilizes the hole 64 or 82 in the first blade 42 that is outward to the ends 50 or 52 of the first blade 42. Similarly, the hole 110 is positioned at the second far end 36 of the crossbar 28 and is used when the cutting edge in use utilizes the hole 66' or 80' in the second blade 44 that is inward from the ends 50' or 52' of the second blade 44. The hole 108 is positioned in the second intermediate attachment position 40 and is used when the cutting edge in use utilizes the hole 64' or 82' in the second blade 44 that is outward to the ends 50' or 52' in the second blade 44. This serves to position the blades 42 and 44 away from the sides 12 and tires 116 of the cutting machine 10 as the blades 42 and 44 are rotated.

Figure 3:
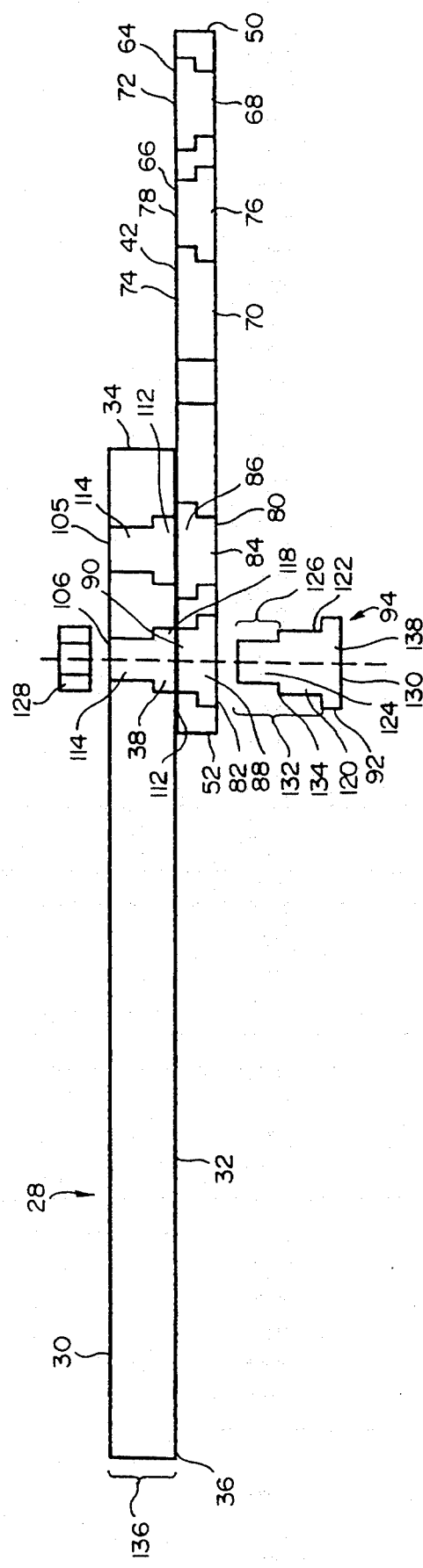
FIG. 3 is a side plan view of the blade assembly after the blade is attached to the crossbar.
Figure 4B:
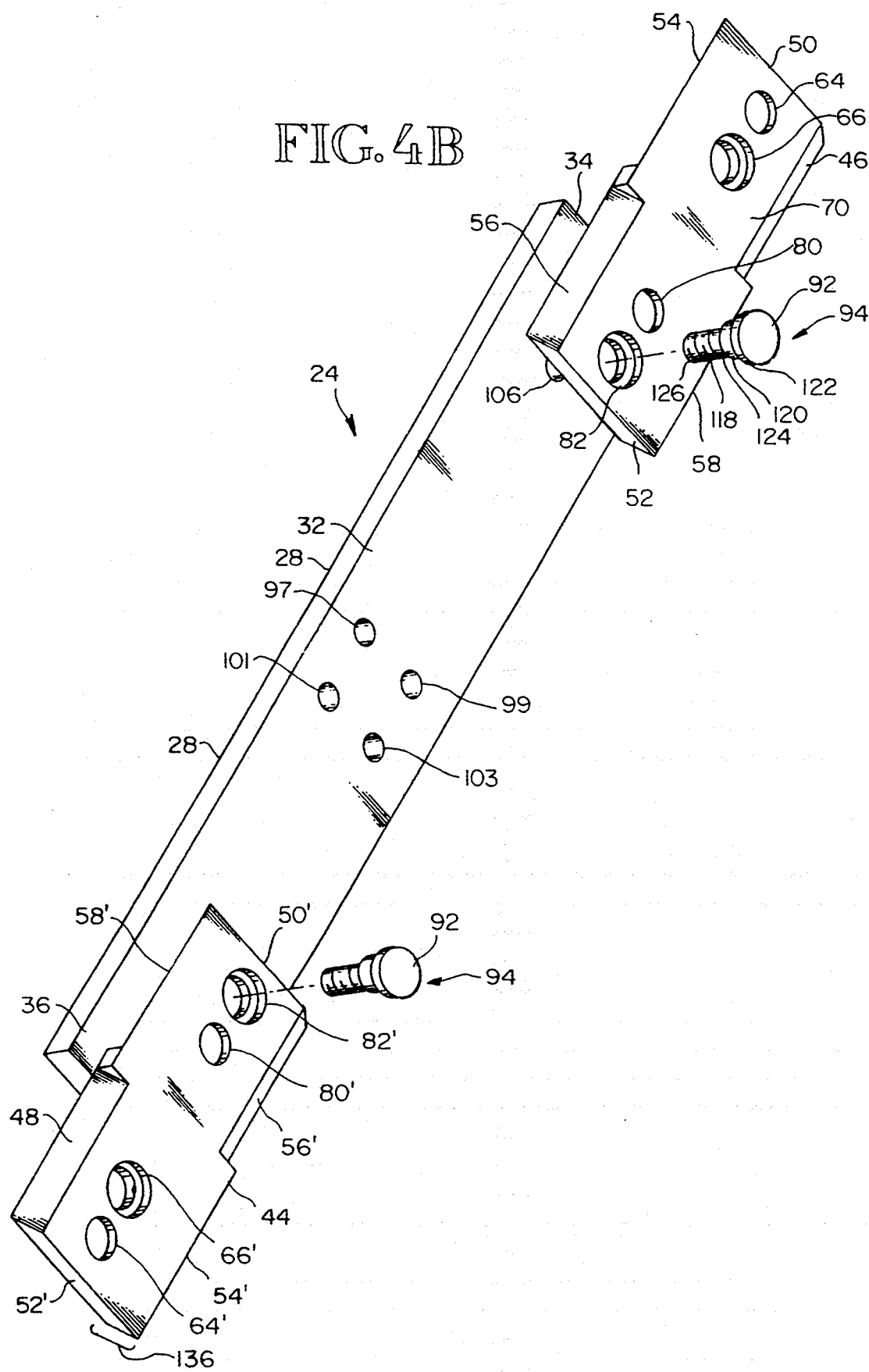
FIG. 4B is an exploded bottom perspective view of the blade assembly when the first cutting edge is used.

In use, when one of the four available cutting edges 46, 54, 56, and 58 is chosen to be put in the using position as cutting edge 46 in FIGS. 2, 4A and 4B, an abruptly graduated diameter attaching bolt 94 is positioned through the counter-bored hole 82 in the second end 52 of the blade 42 opposite the cutting edge 46 in use, so that the head 92 of the bolt 94 is recessed from the lower surface 70 of the blade 42 that is presented to the ground 60. The portion 118 of the bolt 94 that exits through the upper surface 74 of the blade 42 is then positioned through the corresponding counter-bored hole 106 in the first intermediate attaching position 38 of the crossbar 28 such that the smallest diameter 84 of the hole 82 in the blade 42 matches the largest diameter 112 of the corresponding counter-bored hole 106 in the crossbar 28. In this way, a bolt 94 is used with a large diameter 120 at its top 122 closest to its head 92 for a strong, secure attachment, while having a smaller diameter 124 at its screw end 126 for easy securement of the bolt 94 at the top surface 30 of the crossbar 28 with a more manageably sized nut 128. The top surface 30 of the crossbar 28, the upper surface 74 of the blade 42 and the engagement of the nut 128 over the attaching bolt 94 is seen most clearly in the side plan view of FIG. 3.

FIG. 2 of the drawing is an exploded bottom perspective view of the present blade assembly 24 as it fits together during operation. The attaching bolt 94 used in the present blade assembly 24 has a head 92 that is recessed into the lower surface 70 of the blade 42 so that the top 130 of the bolt head 92 is flush with the lower surface 70 of the blade 42, as described with reference to FIG. 1. The lower surface 70 of the blade 42 is presented to the ground 60 during use and as the blade 42 moves along the ground 60 it will strike hard material such as rocks or debris. With the head 92 of the bolt 94 recessed into the lower surface 70 of the blade 42, the head 92 of the bolt 94 will not be chipped, cracked or otherwise compromised upon hitting a hard object. In the preferred embodiment of the present invention, at least $\frac{7}{8}$ inch metal is used to form the blade 42. In this way, with the head 92 of the bolt 94 being recessed into the lower surface 70 of the blade 42, the head 92 of bolt 94 is surrounded by thick metal protecting the head 92 of the bolt 94 even further. There is thereby afforded greater safety to the machine operator, and bystanders. Frequent replacement of a damaged bolt or consequently damaged blade is avoided reducing maintenance and expense and providing greater convenience and safety for the operator.

As explained with reference to FIG. 1 and shown more clearly in FIG. 2, the body 132 of the attaching bolt 94 used in the present blade assembly 24 has a larger diameter 120 at its top 122, near the head 92 of the bolt 94, than at its screw end 126. The body 132 of the attaching bolt 94 has an abrupt change in diameter at a position 134 in its length that corresponds to and is slightly longer than the depth 136 of the blade 42. In assembly and operation then, the counter-bored hole 82 used in the blade 42 has a diameter 88 at the lower surface 70 of the blade 42 slightly larger than the diameter 138 of the head 92 of the bolt 94 to recess the head 92 of the bolt 94 into the lower surface 70 of the blade 42. The body 132 of the bolt 94 has a diameter 120 at its top 122 near the head 92 of the bolt 94, which corresponds to the smaller diameter 90 of the counter-bored hole 82 inside the blade 42 at the upper surface 74 of the blade 42. The attaching bolt 94 of the blade assembly 24 is then positioned through the corresponding hole 106 in the bottom surface 32 of the crossbar 28. The larger diameter 112 of the hole 106 at the bottom surface 32 of the crossbar 28 is the same as the diameter 90 of the hole 82 in the upper surface 74 of the blade 42 which corresponds to the smaller diameter 124 of the screw end 126 of the bolt 94. The body 132 of the bolt 94 then has an abrupt change in diameter so that the screw end 126 of the bolt 94 that comes out through the top surface 30 of the crossbar 28 is smaller than the diameter 120 of the bolt 94 that goes through the bottom surface 32 of the crossbar 28. This graduation in the diameters of the holes 104, 106, 108, and 110 in the crossbar 28 is done to accommodate the substantial body of the bolt 94 or pin used to hold the blade 42 in place for safety reasons, while at the same time allowing a reasonably sized nut 128 to be used to secure the screw end 126 of the bolt 94 that comes out through the top surface 30 of the crossbar 28. The attaching bolt 94 and the configuration of counter-bored holes in the blade 42 and the crossbar 28 generally comprise the attaching means of the present blade assembly 24.

As described with reference to FIGS. 1, 2, and 3 then, when the cutting edge 46 is being used as shown with the cutting edge 46 in the using position in FIGS. 4A and 4B, the attaching bolt 94 is positioned through the corresponding and counter-bored hole 82 in the blade 42 and then positioned through the corresponding and counter-bored hole 106 in the first far end 34 of the crossbar 28. Similarly, to attach the second blade 44 to the second far end 36 of the crossbar 28, using the cutting edge 48, the attaching bolt 94 is positioned through the counter-bored hole 82', in the blade 44 and then positioned through the corresponding and counter-bored 108 in the crossbar 28.

Figure 5A:
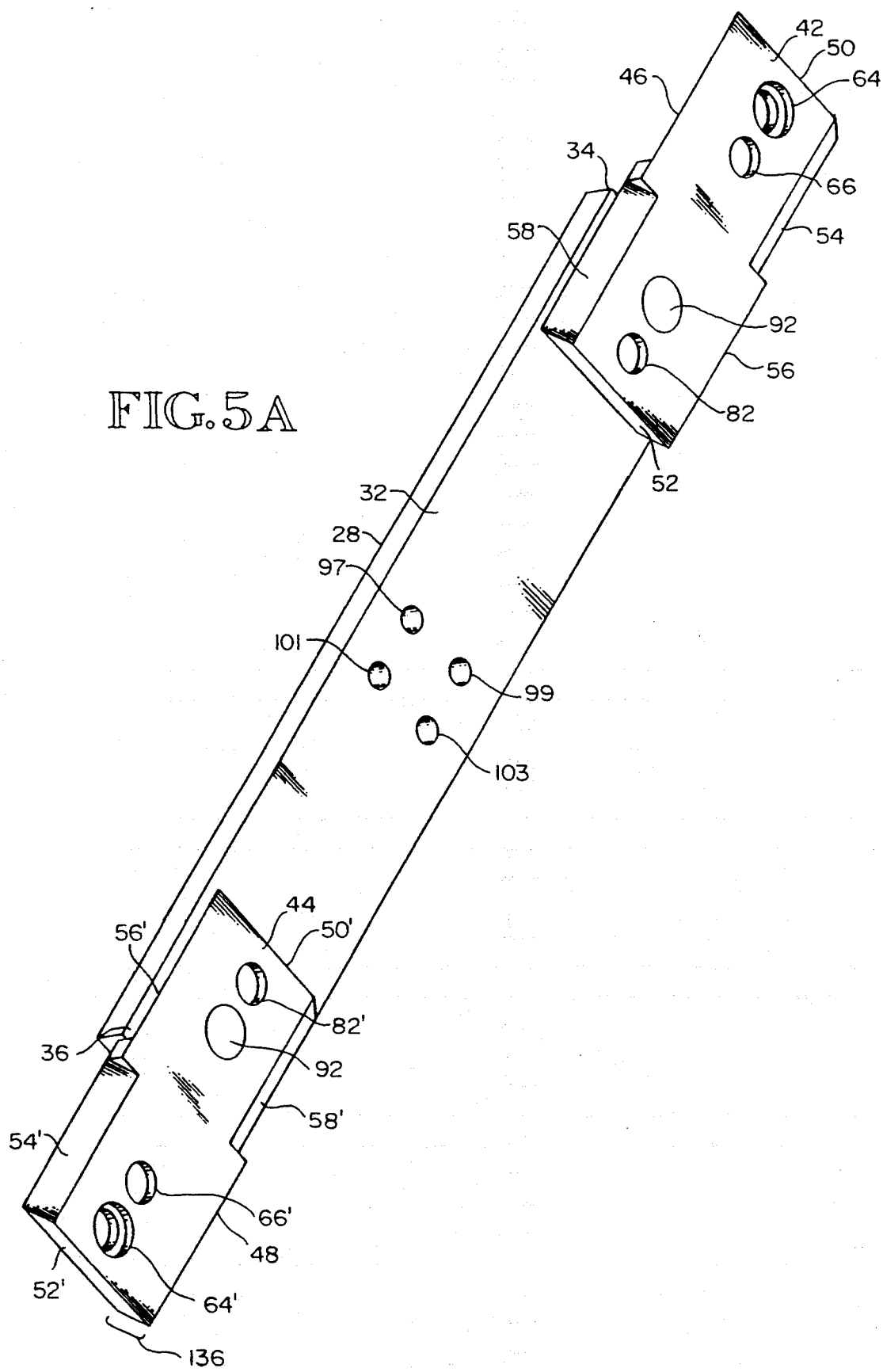
FIG. 5A is a bottom perspective view of the blade assembly after the blade is attached to the crossbar when the second cutting edge is used.

When the cutting edge 46 has dulled and it is desired to alternate the cutting edge on the job before the cutting edge 46 can have its bevel re-cut to provide a re-sharpened cutting edge, the blade 42 can be rotated from side to side or front to back to take advantage of any of the three remaining cutting edges 54, 56, and 58. When it is desired to use the cutting edge 54, as seen in FIGS. 5A and 5B, the attaching bolt 94 is removed and the blade 42 is turned over in a vertical plane from top to bottom so that the cutting edge 54 is now forward facing. The counter-bored hole 80 in the blade 42 that will be used to attach the blade 42 to the crossbar 28 when the cutting edge 54 is being used, has a reverse counter-bore of that described with reference to hole 82 in the blade 42. With the blade 42 turned over then, the hole 80 now has the same counter-bore configuration as that described with reference to FIG. 1 and hole 82. In order to complement the hole 80 in the blade 42, with the hole 105 in the crossbar 28 as described with reference to FIGS. 1, 2 and 3 the counter-bored hole 105 used in the crossbar 28 has the larger diameter 112 at the bottom surface 32 of the crossbar 28 to accept the corresponding diameter 120 in the body 132 of the bolt 94 as it is positioned through the upper surface 74 of the blade 42. In a like manner, to attach the second blade 44 to the second far end 36 of the crossbar 28, using the cutting edge 54', the attaching bolt 94 is positioned through the counter-bored hole 80' in the blade 44 and then positioned through the corresponding and counter-bored hole 110 in the crossbar 28.

Figure 6A:
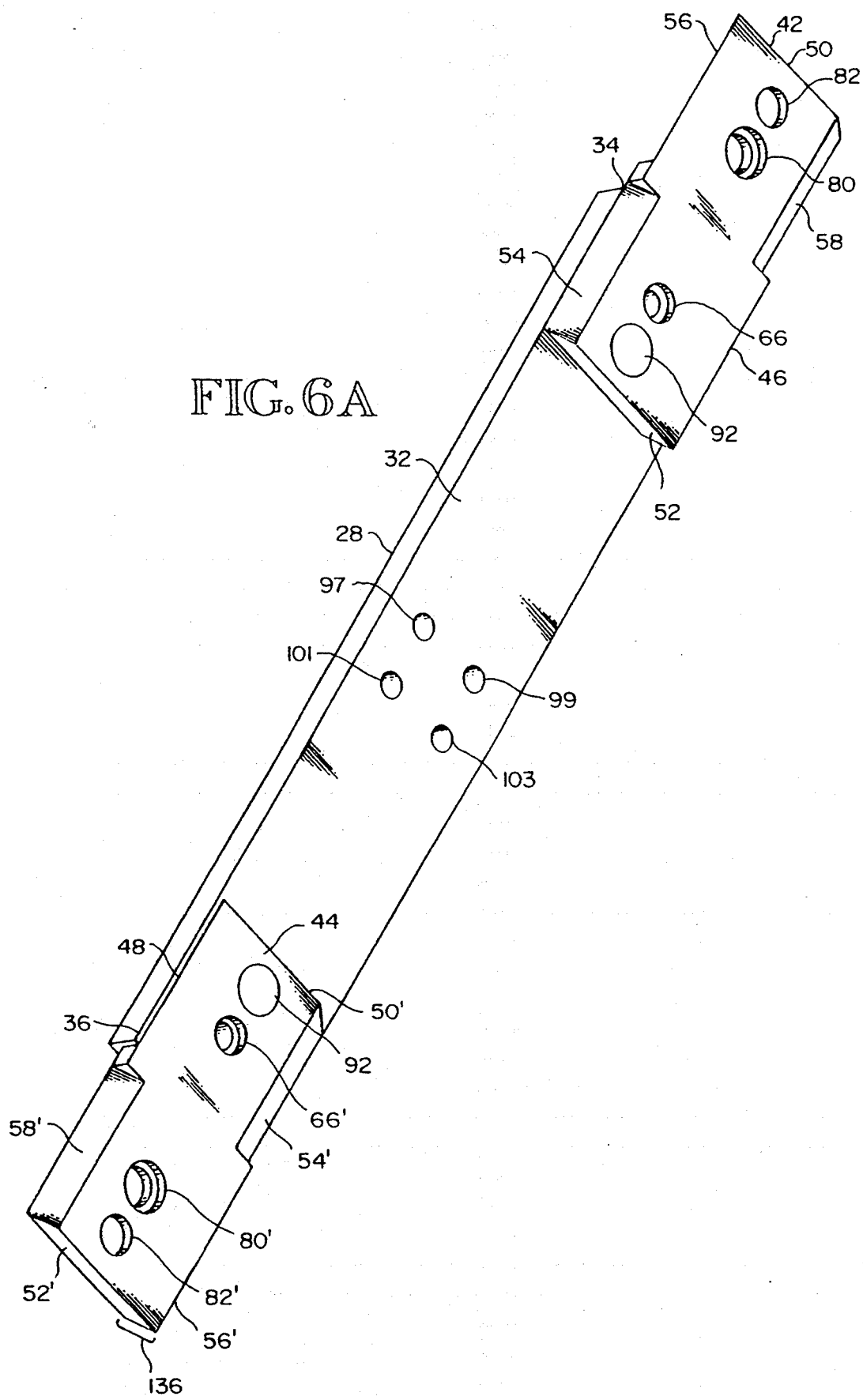
FIG. 6A is a bottom perspective view of the blade assembly after the blade is attached to the crossbar when the third cutting edge is used.
Figure 6B:
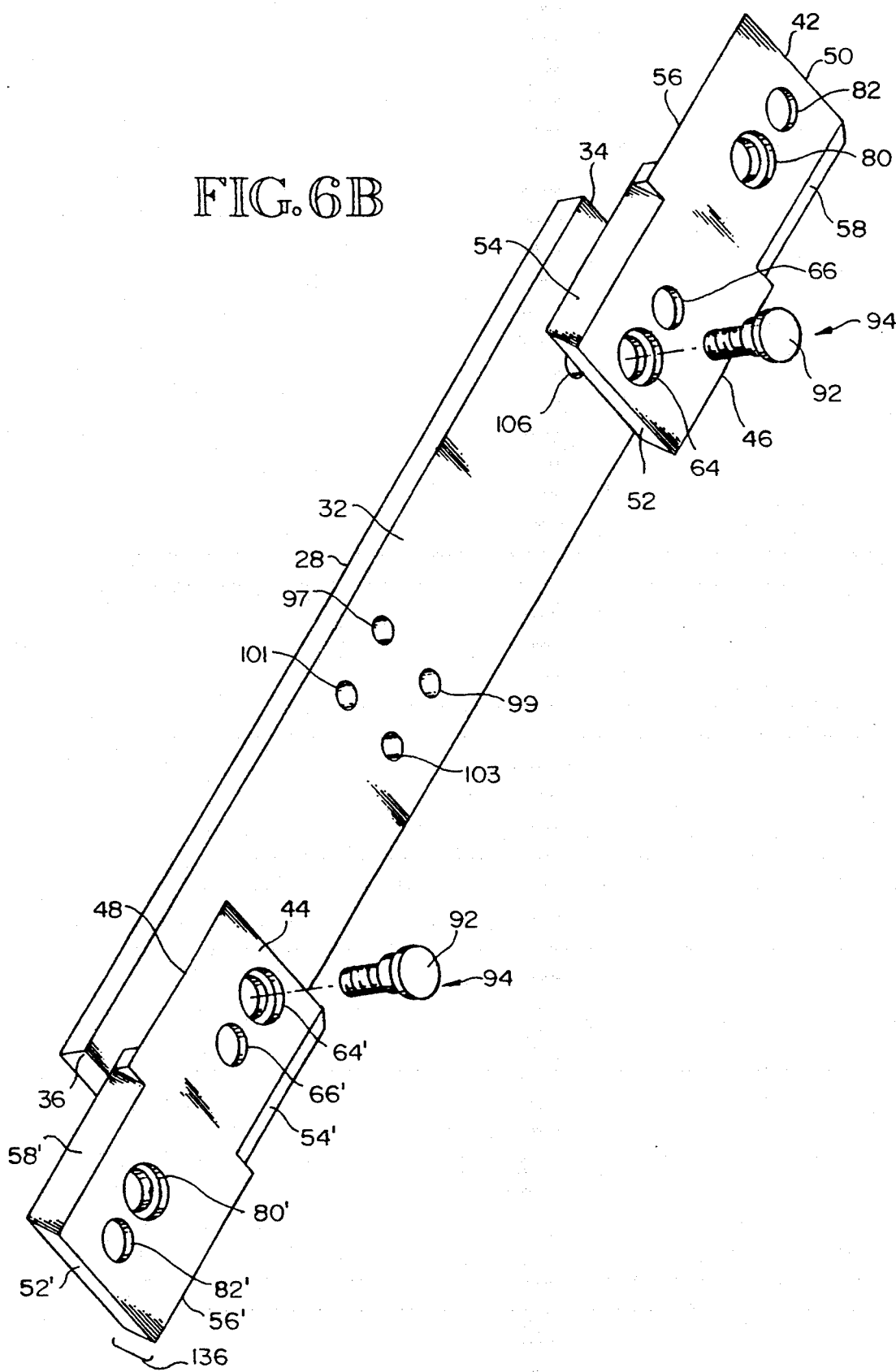
FIG. 6B is an exploded bottom perspective view of the blade assembly when the third cutting edge is used.

Similarly, when the cutting edge 54 is dulled and it is desired to rotate the blade 42 from side to side to now use the cutting edge 58, the attaching bolt 94 and the blade 42 are removed, the blade 42 is turned end over end in a horizontal plane and the cutting edge 58 is now facing forward, ready for use in the cutting position. When the cutting edge 58 is being used, it can be seen then in FIGS. 6A and 6B that the attaching bolt 94 and the blade 42 are first removed, the blade 42 has been turned over from end to end and then the attaching bolt 94 is positioned through the counter-bored hole 64 in the blade 42 and through the corresponding counter-bored hole 106 in the first far end 34 of the crossbar 28. To attach the second blade 44 to the second far end 36 of the crossbar 28, using the cutting edge 58', the attaching bolt 94 is positioned through the counter-bored hole 64' in the blade 44 and then positioned through the corresponding and counter-bored hole 108 in the crossbar 28.

Figure 7A:
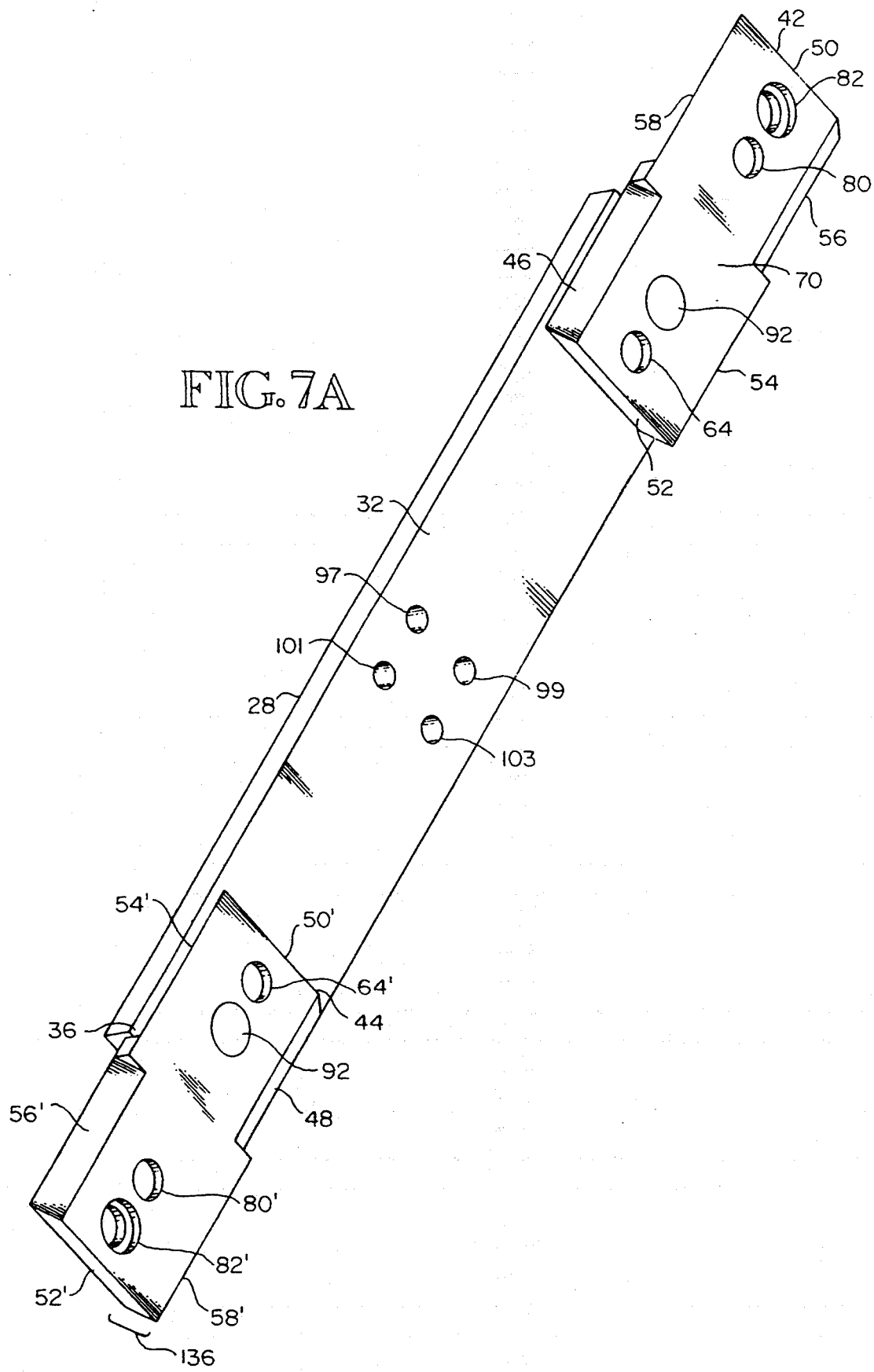
FIG. 7A is a bottom perspective view of the blade assembly after the blade is attached to the crossbar when the fourth cutting edge is used.

Also, in a similar fashion, to take advantage of the yet unused cutting edge 56, the attaching bolt 94 and blade 42 are again removed, the blade 42 is turned in a vertical plane from top to bottom and then the attaching bolt 94 is positioned through the counter-bored hole 66 in the blade 42 and through the corresponding counter-bored hole 105 in the crossbar 28 as seen in FIGS. 7A and 7B. To attach the second blade 44 to the second far end 36 of the crossbar 28, using the cutting edge 56', the attaching bolt 94 is positioned through the counter-bored hole 66' in the blade 44 and then positioned through the corresponding and counter-bored hole 110 in the crossbar 28. In the use of all four of the cutting edges 46, 54, 58 and 60 then, the cutting edge is forward facing from the front end 11 of the machine 10. When the blade 42 is turned either from front to back or side to side then, the hole in the blade 42 which has the largest lower diameter and is on the opposite end of the blade 42 away from the cutting edge in use, will be used to position the attaching bolt 94 through and into the crossbar 28. The attaching bolt 94 will always go through the lower surface 70 of the blade 42 having the head 92 of the bolt 94 recessed from the lower surface 70 of the blade 42, no matter which cutting edge is in use. The attaching bolt 94 is then positioned through the bottom surface 32 of the crossbar 28 and will exit through the top surface 30 of the crossbar 28 where the nut 128 will be secured to the screw end 126 of the bolt 94. It can be seen therefore that with a minimum of time and expense, the operator has four cutting edges available on each blade 42 or 44 at the job while having only two blades attached to the cutting machine 10. When the four cutting edges 46, 54, 56 and 58 or 48, 54', 56' and 58' on either blade 42 or 44 of the present blade assembly have all been dulled and consequently rotated or inverted so that all four cutting edges 46, 54, 56 and 58 have been used, the blades 42 and 44 can be returned to the shop where each one of the cutting edges 46, 48, 54, 56, 58, 54', 56', and 58' can have a new bevel cut thereby providing four new cutting edges to each blade 42 or 44. Because of Because of the thicker metal of the present blade 42, it is possible to re-cut a new bevel for each cutting edge 46, 54, 56 and 58 at least once thereby making the present blade assembly 24 even more convenient and economical to use.

Re-torch cutting the blades 42 or 44 makes all four cutting edges 46, 54, 56 and 58 or 48, 54', 56' and 58' on each blade completely renewable. By removing some of the metal from the cutting edges 46, 48, 54, 56 and 58 with a torch cut, any nicks or other missing pieces in the existing cutting edges 46, 48, 54, 56 and 58 are removed. This is an advantage over the prior art which if it is re-sharpenable, only resharpens the existing cutting edge with a grinder or other similar means, leaving the cutting edge as it is with all nicks and other cut reducing flaws intact.

In a second embodiment of the present blade assembly as seen in FIG. 9, there is shown an alternative crossbar to that shown in FIGS. 1 and 2. In FIG. 8, the alternative crossbar 140 is curved in its horizontal plane to provide offsets 141 and 142 for the cutting edges 46 and 48 in use so that the cutting edges 46 and 48 in use are brought closer to the ground 60 and to the brush 62 to be cut as seen in FIG. 1. In this way, it can be seen that the curved crossbar arrangement 140 of FIG. 8 provides a closer cut of the brush 62. An advantage of this second embodiment is that should the operator wish to have the option available at the site of the closer cutting second embodiment or the more generous cut with the first embodiment, the improved blade or a thinner version thereof of the present invention, can be used for either cut desired. Thus, the operator does not have to bring along a more conventional blade with an offset if he wishes to take advantage of the closer cutting offset.

From the foregoing it can be seen that the applicant's invention provides an improved blade assembly that provides four cutting edges on each blade that are rotatable and invertible to take advantage of all four cutting edges; the cutting edges are re-cuttable providing re-sharpened cutting edges thereby prolonging the life of the blade; a counter-bored attachment configuration has been provided so that the top of the head of the attaching bolt is flush with the lower surface of the blade thereby prolonging the life of the attaching bolt; and a graduated diameter bolt is used having a large diameter body for a secure attachment of the blade to the crossbar while having a smaller diameter screw end for receiving a bolt. There has been accomplished by the applicant's invention all of the objects and advantages of the invention. Nevertheless, variation in the structure of the invention and the arrangement of the various parts are within the spirit and scope of the applicant's invention. The embodiments given have been given only by way of illustration and the applicant is not to be limited to the embodiments shown and described.

Having described my invention, I claim:

1. A blade assembly for a brush cutting machine, the cutting machine having two sides and a crossbar, the crossbar having a top surface, a bottom surface and at least one hole positioned therethrough, the blade assembly comprising:
   a) at least one generally rectangular metal member having a first and second ends, an upper surface and a lower surface, and having at least two cutting edges on the first end, including one forward facing cutting edge and one rearward facing cutting edge, and at least one cutting edge on the second end, including a forward facing cutting edge, the cutting edges each having a bevel;
   b) an attaching means for attaching the metal member to the bottom surface of the crossbar, the metal member being free swinging relative to the crossbar; and
   whereby the metal member is rotatable from the first end to the second end and is invertible from the upper surface to the lower surface.

2. The blade assembly as defined in claim 1 wherein there are two cutting edges positioned on the first end of the metal member including a forward facing cutting edge and a rearward facing cutting edge and two cutting edges positioned on the second end of the metal member, including a forward facing cutting edge and a rearward facing cutting edge.

3. The blade assembly as defined in claim 1 wherein the metal member is formed of at least ⅞ inch metal.

4. The blade assembly as defined in claim 1 wherein the bevel of each of the cutting edges is re-cuttable and renewable.

5. The blade assembly as defined in claim 1 wherein the attaching means is flush with the lower surface of the metal member.

6. The blade assembly as defined in claim 5 wherein the first end of the metal member is the cutting edge using end and wherein:
   the attaching means comprises at least one counter-bored hole positioned on the second end of the metal member and a bolt having a head and a body, the bolt being positioned through the counter-bored hole in the metal member and positioned through a corresponding hole in the crossbar and secured at the top surface of the crossbar with a nut, the head of the bolt thereby being flush with the lower surface of the metal member.

7. The blade assembly as defined in claim 6 wherein the attaching means further comprises:
   a crossbar having two ends and having at least one counter-bored hole positioned therethrough; and the body of the bolt having a graduated diameter with a large diameter at an end proximate to its head and a small diameter at an end distal to its head; and
   whereby the bolts large diameter body proximate to its head is used to attach the metal member to the crossbar for a secure attachment.

8. The blade assembly as defined in claim 7 wherein the bolts small diameter body distal to its head is used to secure the bolt with a nut at the top surface of the crossbar.

9. The blade assembly as defined in claim 7 wherein the crossbar has four counter-bored holes positioned therethrough for positioning the metal member outward from the end of the crossbar to which it is attached, thereby positioning the metal member outward from the sides of the cutting machine.

10. The blade assembly as defined in claim 1 wherein the crossbar is curved to thereby position the cutting edge of the metal member being used close to the brush to be cut.

11. A method for cutting brush using a brush cutting machine, the brush cutting machine having two sides and a crossbar, the crossbar having a top surface, a bottom surface and at least one hole positioned therethrough comprising the steps of:
   a) providing a blade assembly comprising a generally rectangular metal member having a first and second ends, an upper surface and a lower surface;
      i) providing at least two cutting edges on the first end of the metal member, including one forward facing cutting edge and one rearward facing cutting edge, the cutting edges each having a bevel;
      ii) providing at least one cutting edge on the second end of the metal member, including a forward facing cutting edge, the cutting edge having a bevel;
   b) providing an attaching means for attaching the metal member to the bottom surface of the crossbar, the metal member being free swinging relative to the crossbar;
   c) inverting the metal member from the upper surface of the metal member to the lower surface of the metal member after the forward facing cutting edge on the first end of the metal member is dulled, thereby positioning the rearward facing cutting edge on the first end of the metal member forwardly in cutting position; and d) rotating the metal member from the first end to the second end after the forwardly facing cutting edge thus positioned as a result of step C is dulled, thereby positioning the forwardly facing cutting edge on the second end of the metal member forwardly in cutting position.

12. The method of cutting brush as defined in claim 11 wherein there are two cutting edges positioned on the first end of the metal member including a forward facing cutting edge and a rearward facing cutting edge and two cutting edges positioned on the second end of the metal member including a forward facing cutting edge and a rearward facing cutting edge further comprising the step of:
   e) inverting the metal member from the upper surface of the metal member to the lower surface of the metal member after the forward facing cutting edge thus positioned as a result of step d is dulled, thereby positioning the rearwardly facing cutting edge on the second end of the metal member forwardly in cutting position.

13. The method of cutting brush as defined in claim 11 wherein the metal member is formed of at least ⅜ inch metal.

14. The method of cutting brush as defined in claim 11 wherein the bevel of each cutting edge is re-cuttable and renewable.

15. The method of cutting brush as defined in claim 11 wherein the attaching means is flush with the lower surface of the metal member.

16. The method of cutting brush as defined in claim 15 wherein the first end of the metal member is the cutting edge using end and further comprising the steps of:
   e) providing the attaching means of step b with at least one counter-bored hole positioned on the second end of the metal member and a bolt having a head and a body, the bolt being positioned through the counter-bored hole in the metal member and positioned through a hole in the crossbar and secured at the top surface of the crossbar with a nut, the head of the bolt thereby being recessed from the lower surface of the metal member.

17. The method of cutting brush as defined in claim 16 further comprising the step of:
   f) providing the attaching means of step e with a crossbar having two ends and having at least one counter-bored hole positioned therethrough and wherein the body of the bolt has a graduated diameter with a large diameter at an end proximate to its head and a small diameter at an end distal to its head; and
   whereby a bolt having a large diameter body is used to attach the metal member to the crossbar for a secure attachment.

18. The method of cutting brush as defined in claim 17 wherein the crossbar has a top surface and a bottom surface and wherein the bolts small diameter body distal to its head is used to secure the bolt with a nut at the top surface of the crossbar.

19. The method of cutting brush as defined in claim 17 wherein the crossbar has four counter-bored holes positioned therethrough for positioning the metal member outward from the end of the crossbar to which it is attached, thereby positioning the metal member outward from the sides of the cutting machine.

20. The method of cutting brush as defined in claim 16 wherein the crossbar is curved to thereby position the cutting edge using end of the metal member close to the brush to be cut.

* * * * *